(12) United States Patent
Jimenez (10) Patent No.: US 11,751,643 B2
(45) Date of Patent: Sep. 12, 2023

(54) CONNECTION DEVICE

(71) Applicant: Herman Jimenez, Greenwood Village, CO (US)

(72) Inventor: Herman Jimenez, Greenwood Village, CO (US)

( * ) Notice: Subject to any disclaimer, the term of this patent is extended or adjusted under 35 U.S.C. 154(b) by 156 days.

(21) Appl. No.: 17/319,966

(22) Filed: May 13, 2021

(65) Prior Publication Data
US 2021/0259369 A1 Aug. 26, 2021

Related U.S. Application Data (63) Continuation-in-part of application No. 16/278,159, filed on Feb. 17, 2019, now abandoned.

(51) Int. Cl.
*A44B 17/00* (2006.01)

(52) U.S. Cl.
CPC ........ *A44B 17/007* (2013.01); *A44B 17/0023* (2013.01); *A44B 17/0041* (2013.01)

(58) Field of Classification Search
CPC .............. A44B 17/007; A44B 17/0023; A44B 17/0041; A44C 5/2057
See application file for complete search history.

(56) References Cited

U.S. PATENT DOCUMENTS

| | | | | | |
|---|---|---|---|---|---|
| 4,236,283 | A | * | 12/1980 | Marosy | A44C 5/2057 24/DIG. 53 |
| 4,758,181 | A | * | 7/1988 | Reedy | H01R 33/09 439/336 |
| 5,205,752 | A | * | 4/1993 | Taguchi | H01R 13/62905 439/157 |
| 5,810,505 | A | * | 9/1998 | Henriott | F16B 12/14 312/265.5 |
| 5,993,238 | A | * | 11/1999 | Kudo | H01R 13/6272 439/352 |
| 2003/0082986 | A1 | * | 5/2003 | Wiens | A63H 33/062 446/120 |
| 2003/0145442 | A1 | * | 8/2003 | Hoshino | A44C 5/2061 24/663 |
| 2007/0281579 | A1 | * | 12/2007 | Sambenedetto | A63H 33/067 446/124 |
| 2010/0075782 | A1 | * | 3/2010 | Stiles | A63B 57/0032 473/402 |
| 2016/0183642 | A1 | * | 6/2016 | Fiedler | A44B 99/005 24/628 |
| 2016/0338455 | A1 | * | 11/2016 | Chuan | A44B 99/005 |
| 2018/0132576 | A1 | * | 5/2018 | Hashimoto | A44B 11/25 |

* cited by examiner

*Primary Examiner* — Eugene L Kim
*Assistant Examiner* — Christopher Glenn
(74) *Attorney, Agent, or Firm* — Roger A. Jackson (57) ABSTRACT

A connection device that facilitates easy manual connector assembly and disassembly, however, having the ability to semi securely hold the connectors together with a progressive frictional interference fit that can be disassembled with some additional manual frictional force, further, the connector assembly can desirably have a rotational lock interface to prevent inadvertent relative rotation between the connector assembly, in addition the connector assembly would have piloting interface to add bending moment resistance to the connector interface.

3 Claims, 12 Drawing Sheets

CONNECTION DEVICE

RELATED APPLICATION

This application is a continuation in part of U.S. patent application Ser. No. 16/278,159 filed on Feb. 17, 2019 by Herman Jimenez of Greenwood Village, Colo., U.S.

FIELD OF THE INVENTION

The present invention is generally related to flexible removably engageable connections and more particularly to flexible removably engageable connections that are rotationally resistant and have a frictional fit to hold the connection together to accomplish a substantially secure hold of the connection and to facilitate manual separation of the connection, wherein the frictional fit hold is repeatable.

BACKGROUND OF THE INVENTION

Connectors have a multitude of uses to removably engage a first article to a second article for many functional uses, there can be numerous desired conditions of the first and second article connection that can include a means for locking as between the first and second article, a means for locking or allowing rotation as between the first and second articles or even having rotation with a selected amount of rotational friction. Further the connectors can have requirements to be fluid tight, or to have security measures to allow easy connecting and difficult disconnecting, say in a medical setting, or one-way assembly, such that the connectors can be assembled but not disassembled, also the connectors have help in positioning/balancing the first and second articles relative to one another for their desired function, further the connectors can be operational to relieve operational stresses as between the first and second articles, further to the connector adding protective shields to either of the articles for safety.

Looking at the prior art in this area in U.S. Pat. No. 10,758,721 to Sonderegger discloses a medical infusion fluid connector that has an anti-rotation section, see for example FIG. 86, that includes axial cutouts 532, 534 connected by fulcrum webs 536 and cantilevered gripping portions 530, that all act to provide a rotational lock of the needle guard.

Next, In U.S. Pat. No. 8,025,517 to Larkin disclosed is a connector with a flexible saw tooth rib interface (circumferential) that provides an asymmetric sliding resistance.

Further, in U.S. Pat. No. 10,833,571 to Esposito that discloses a mounting peg for a press fit onto a step motor connecting to a PC board, the mounting peg utilizes elastically deformable ribs 20 that are axially positioned, see FIGS. 4b, 4c, & 4d, plus a locking pin 16, 17, for axial positioning, see all combined in FIG. 4e. Esposito has the distinction of the axial stops being steps for keeping the motor mount level.

Continuing, U.S. Pat. No. 9,054,443 to Fukushima that discloses an electric car charger connector having a case and a rib with protrusions on a housing, specifically the axial rib 30L, see FIGS. 1, 3, also protrusion 21T in FIGS. 1 and 2, wherein the axial rib 30L corresponds to the protrusion 21T to eliminate circumferential backlash on the connector, i.e. a clocking lock. Thus, Fukushima having an axial rib with the distinction of the axial rib mating with an axial groove.

Next, U.S. Pat. No. 5,256,153 to Hake discloses a hypodermic needle guard that includes ribs 64a,b as shown in FIG. 7, that axially slidably engage longitudinal grooves 60a, b, to provide an axially friction fit wedge when sleeve 14 is moved to the extended position once the needle has been used to permanently cover the needle, thus Hake is somewhat similar to Sonderegger.

Continuing, U.S. Pat. No. 4,431,256 to Piscitelli discloses a split sleeve socket contact that includes a rib 46 that provides axial friction against pin contact 22, with the rib 46 being flexible with three points of radial contact on the pin 22 for a balanced and centered support of the pin 22, as distinguished to a single asymmetric rib.

Moving onward, United States Patent Application Publication Number US2020/0215272 to Sanders, discloses a safety needle device with flexible locking rib element 70, see FIG. 1, wherein rib element 70 locks over the needle to prevent re-use of the needle, see FIG. 8 with the same end function as Hake.

Next, U.S. Pat. No. 2,839,320 to Hill discloses a plurality of pipe connectors that includes six-way, with others that are three-way or four-way, the connection as between the pipe connectors and pipe utilizes split expansion nuts that have an internal thread that a bolt is threaded through wherein the bolt head rests against a shoulder of the connector, with the bolt being tightened and the expansion nuts moves outward against the internal diameter of the pipe to friction lock the pipe to the connector while at the same time pulling the pipe/expansion nut and connector axially toward one another. Split rings 24, 61 in channels 23, 59 in the expansion nut are used to maintain the split expansion nut pieces in proper positional orientation after being inserted into the pipe interior.

Further, U.S. Pat. No. 4,576,350 to Bond discloses a portable bag filling stand that uses connectors being three-way, four-way, and five-way, the connection between the connectors and pipe frame (PVC) is a standard slidable engagement wherein Bond has hooks and a balanced load via horizontally opposing bag supports.

Next, United States Patent Application Publication Number US2016/0302366 to Shadowshot, discloses a plant support system that includes a five-way connector that has three male triangular (cross) sections and two female triangular sections, wherein the female triangular sections are connected to the vertical stand portion and the three male triangular sections extend to paddles that each form a frame that the plant finds support in.

What is needed is a connector that facilitates easy manual connector assembly and disassembly, however, having the ability to semi securely hold the connectors together with a progressive frictional interference fit that can be disassembled with some additional manual frictional force, further, the connector assembly can desirably have a rotational lock interface to prevent inadvertent relative rotation between the connector assembly, in addition the connector assembly would have piloting interface to add bending moment resistance to the connector interface, plus further for the connector assembly to be fully repeatable in the ability to semi securely hold the connectors together with a progressive frictional interference fit that can be disassembled with some additional manual frictional force, and be repeated.

SUMMARY OF INVENTION

Broadly, the present invention is a connection device that comprises a flexible male element that includes the male element base that is adjacent to the first article, the flexible male extension that has a flexible male extension proximal end portion and an opposing flexible male extension distal end portion with the longitudinal axis spanning therebetween, with the flexible male extension distal end portion terminating in a flexible male extension distal end portion margin. Wherein the flexible male extension proximal end portion is adjacent to the male element base, the flexible male extension having a male outer surface disposed between the flexible male extension proximal end portion and the flexible male extension distal end portion, a rib disposed on the male outer surface, wherein the rib is positioned substantially parallel to the longitudinal axis, further the rib extends from the flexible male extension proximal end portion to the flexible male extension distal end portion, wherein the rib has a termination short of the flexible male extension distal end portion margin leaving a gap portion at the male outer surface from the rib termination to the flexible male extension distal end portion margin.

The connection device also includes a flexible female element that comprises a female element base that is adjacent to the second article and a flexible female extension that has a flexible female extension proximal end portion and an opposing flexible female extension distal end portion with a longwise axis spanning therebetween, with the flexible female extension distal end portion terminating in a flexible female extension distal end portion margin, wherein the flexible female extension proximal end portion is adjacent to the flexible female element base. The flexible female extension having a female outer surface disposed between the flexible female extension proximal end portion and the flexible female extension distal end portion, a female inner surface disposed between the flexible female extension proximal end portion and the flexible female extension distal end portion, wherein positionally the longitudinal axis and the longwise axis are positioned coincident to one another as between the flexible male and female elements. Wherein operationally to manually assemble the connection device into an assembled operational state, the male outer surface is inserted into the female inner surface utilizing the gap portion as a pilot to facilitate ease of an initial slip fit insertion of the male outer surface into the female inner surface after which the rib then contacts the female inner surface and turns the initial slip fit insertion into a progressive frictional interference fit of the male outer surface into the female inner surface that functionally results in a semi-securely hold of the flexible male and female elements together via an increasing contact length along the longitudinal axis of the rib with the female inner surface. To operationally reverse and disassemble the connection device into a disassembled operational state, the flexible male and female elements are manually pulled apart along the longitudinal and longwise axes, against the progressive frictional interference fit that continuously lessens the rib contact length to progressively reduce the frictional interference fit until the flexible male and female elements are separated from one another.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 5 shows a cross section view 5-5 from FIG. 3, wherein FIG. 5 shows the flexible female element that includes the female element base, the longwise axis, the female inner and outer surfaces, and the female ridge protrusion;

FIG. 6 shows an end elevation view 6-6 from FIG. 1, wherein FIG. 6 shows the flexible male element including the male element base, the male outer surface, the rib, and the male channel;

FIG. 7 shows an end elevation view 7 from FIG. 3, wherein FIG. 7 shows the flexible female element that includes the female element base, the female inner and outer surfaces, and the female ridge protrusion;

FIG. 11 shows a cross section view 11-11 from FIG. 9, wherein FIG. 11 shows the flexible male element outer surface being initially inserted into the flexible female element inner surface with the rib not yet contacting the flexible female element inner surface thus the pilot makes the initial slip fit insertion as between the flexible male element outer surface being initially inserted into the flexible female element inner surface, so FIG. 11 is the cross section view 11-11 from FIG. 9; and FIG. 12 shows a cross section view 12-12 from FIG. 10, wherein

REFERENCE NUMBERS IN DRAWINGS

50 Connection device
55 First article

60 Second article
65 Flexible male element
70 Male element base
75 Flexible male extension
80 Proximal end portion of the flexible male extension 75
85 Distal end portion of the flexible male extension 75
90 Longitudinal axis
95 Margin of the distal end portion 85 of the flexible male extension 75
100 Male outer surface
105 Rib
110 Rib 105 positioned substantially parallel to the longitudinal axis 90
115 Rib 105 extending from the proximal end portion 80 of the flexible male extension 75 to the distal end portion 85 of the flexible male extension 75
120 Termination of the rib 105
125 Gap portion of the male outer surface 100
130 Flexible female element
135 Female element base
140 Flexible female extension
145 Proximal end portion of the flexible female extension 140
150 Distal end portion of the flexible female extension 140
155 Longwise axis
160 Margin of the distal end portion 150 of the flexible female extension 140
165 Female outer surface
170 Female inner surface
175 Coincident position of the longitudinal 90 and longwise 155 axes
180 Manual assemble of the connection device 50 wherein the male outer surface 100 is inserted into the female inner surface 170
185 Initial slip fit insertion
190 Utilizing the gap portion 125 as a pilot for the initial slip fit insertion 185
195 Rib 105 contacting the female inner surface 170
200 Contact length of the rib 105
205 Progressive frictional interference fit
210 Semi-secure hold of the flexible male 65 and female 130 elements together via an increasing contact length 200 along the longitudinal axis 90 of the rib 105 with the female inner surface 170
215 Pulling apart of flexible male 65 and female 130 elements from one another
220 Manual reverse and dissemble of the connection device 50 flexible male 65 and female 130 elements pulled apart 215 from one another along the longitudinal 90 and longwise 155 axes
225 Continuous lessening of the rib contact length 200
230 Progressively reduce the frictional interference fit 205
235 Assembled operational state of the connection device 50
240 Disassembled operational state of the connection device 50
245 Male channel
250 Substantially parallel position of the male channel 245 to the longitudinal 90 axis
255 Male channel 245 disposed in the male outer surface 100
260 Male channel 245 extending from the flexible male extension 75 proximal end portion 80 to the flexible male extension 75 distal end portion 85
265 Female ridge protrusion
270 Substantially parallel position of the female ridge protrusion 265 to the longwise 155 axis
275 Female ridge protrusion 265 path of connection disposed on the female inner surface 170
280 Female ridge protrusion 265 extending from the flexible female extension 140 proximal end portion 145 to the flexible female extension 140 distal end portion 150
285 Female ridge protrusion 265 being slidably received into the male channel 245
290 Rotational engagement of the flexible female extension 140 to the flexible male extension 75 about both the longitudinal 90 and longwise 155 axes in the connection device 50 assembled operational state 235
295 Male outer surface 100 and female inner surface 170 slip fit positional relationship along both the longitudinal 90 and longwise 155 axes
300 Radial distance of the male 100 and female 170 slip fit positional relationship 295
305 Perpendicular position of the radial distance 300 to both the longitudinal 90 and longwise 155 axes
310 Axial engagement distance
315 Bending axis
320 Perpendicular position of the bending axis 315 to both the longitudinal 90 and longwise 155 axes
325 Guide of the male 100 and female 170 slip fit positional relationship
330 Rigidity of the guide 325 in the bending axis 315 when the connection device 50 is in the assembled operational state 235
335 Rib 105 positioned adjacent to the male channel 245
340 Rib 105 distance
345 Rib 105 distance 340 positioned perpendicular to the longitudinal 90 axis
350 Male channel 245 width distance
355 Male channel 245 width distance positioned perpendicular to the longitudinal 90 axis
360 Higher female inner surface 170 rigidity
365 Stiffening beam of the female ridge protrusion 265
370 Substantially circular shape of the male outer surface 100
375 First plane
380 Perpendicular position of the first plane 375 to the longitudinal 90 axis
385 Substantially circular shape of the female inner surface 170
390 Second plane
395 Perpendicular position of the second plane 390 to the longwise 155 axis
400 Symmetric stress distribution in the flexible male 75 and female 140 extensions
405 Bending force
410 Bending force 405 applied in any position about the longitudinal 90 and longwise 155 axes
415 Substantially trapezoidal cross-section shape of the female ridge protrusion 265
420 Third plane
425 Perpendicular position of the third plane 420 to the longwise 155 axis
430 Substantially trapezoidal cross-section shape of the male channel 245
435 Fourth plane
440 Perpendicular position of the fourth plane 435 to the longitudinal 90 axis

DETAILED DESCRIPTION

Figure 1:
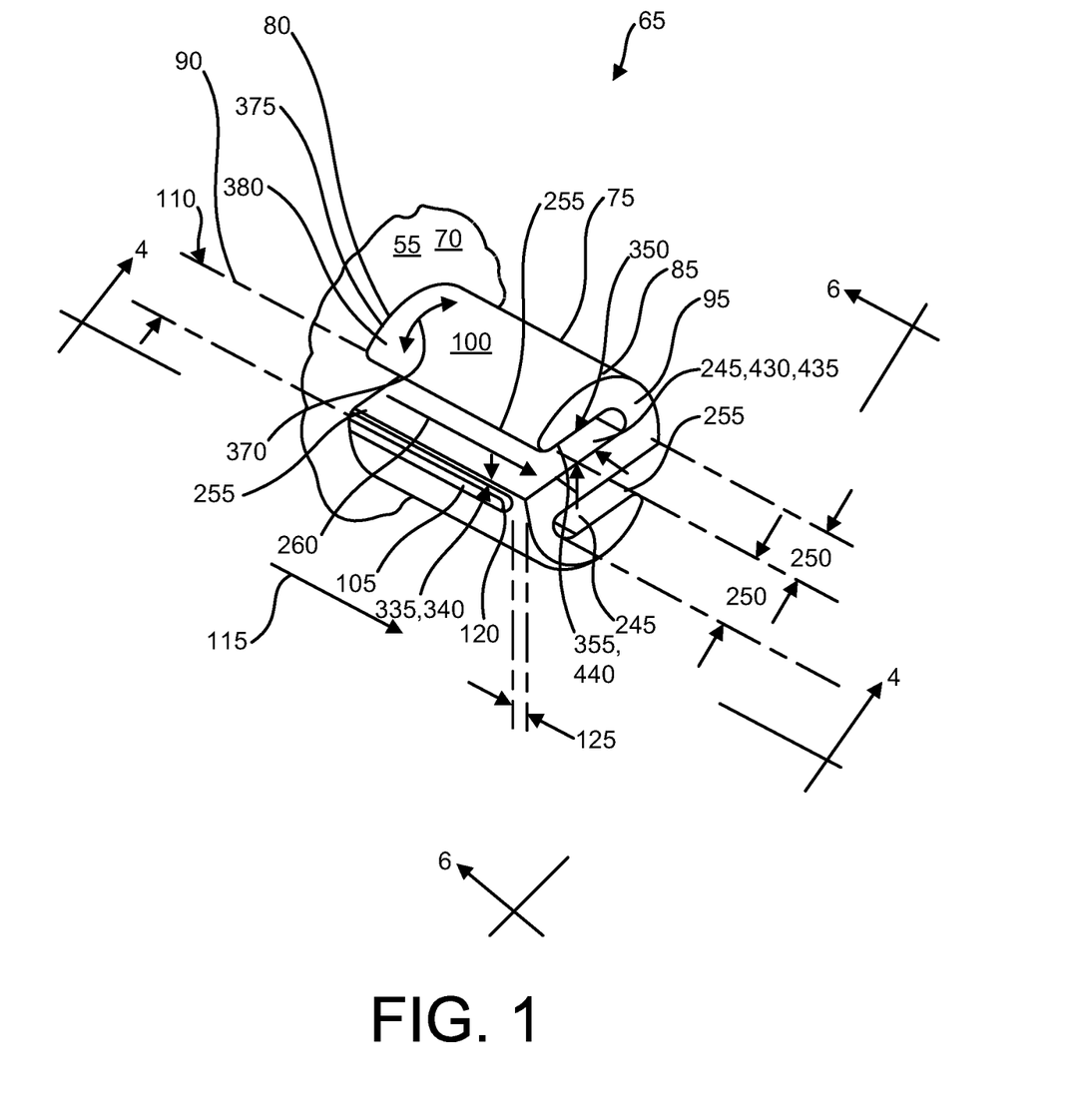
FIG. 1 shows an upper perspective view of the flexible male element including the male element base, the longitudinal axis, the male outer surface, the rib, and the male channel.
Figure 2:
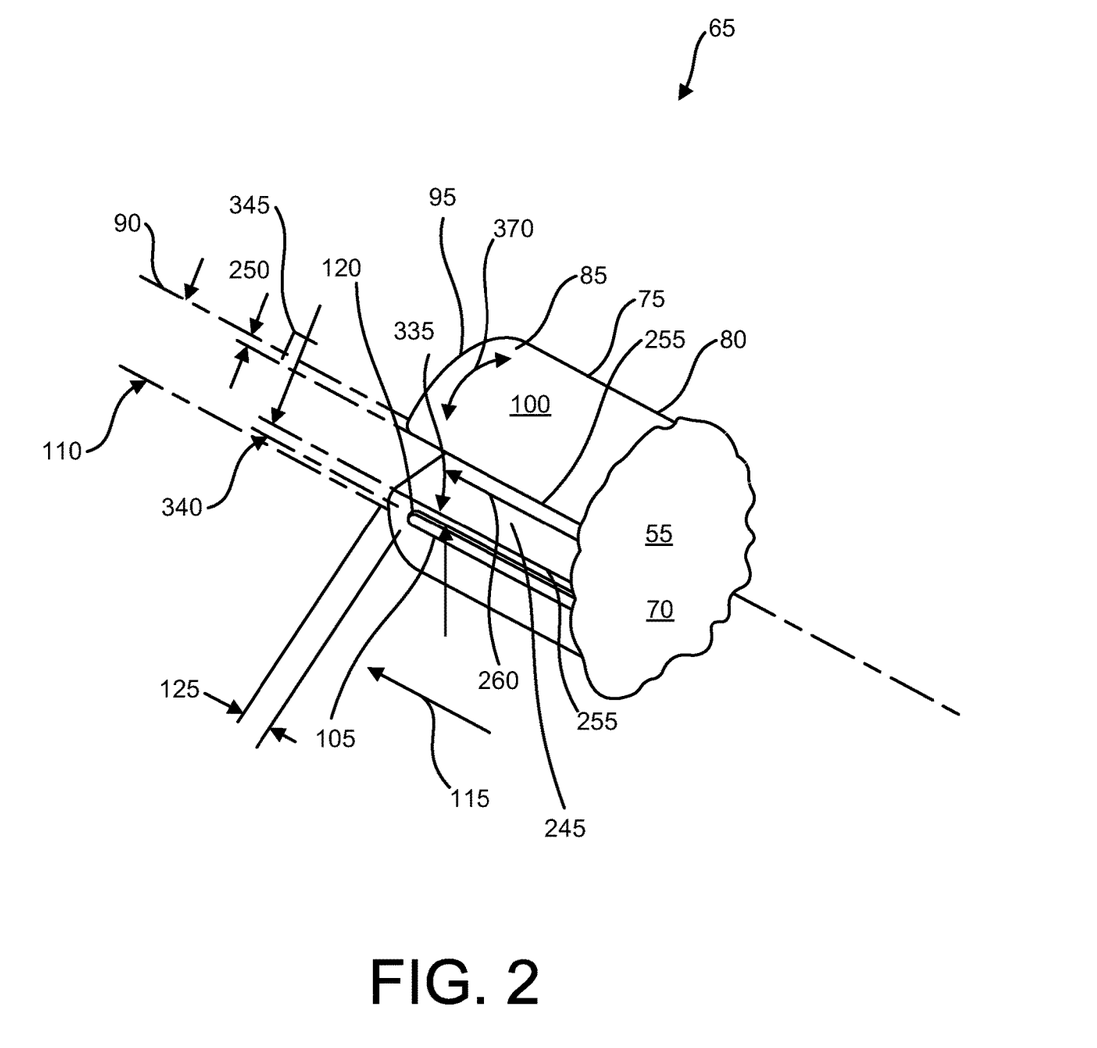
FIG. 2 shows a reversed upper perspective view to the FIG. 1 upper perspective view, with FIG. 2 showing the flexible male element including the male element base, the longitudinal axis, the male outer surface, the rib, and the male channel.

With initial reference to FIG. 1 shown is an upper perspective view of the flexible male element 65 including the male element base 70, the longitudinal axis 90, the male outer surface 100, the rib 105, and the male channel 245. Further, FIG. 2 shows a reversed upper perspective view to the FIG. 1 upper perspective view with FIG. 2 showing the flexible male element 65 including the male element base 70, the longitudinal axis 90, the male outer surface 100, the rib 105, and the male channel 245. Continuing, FIG. 3 shows an upper perspective view showing the flexible female element 130 that includes the female element base 135, the longwise axis 155, the female inner 170 and outer 165 surfaces, and the female ridge protrusion 265.

Figure 3:
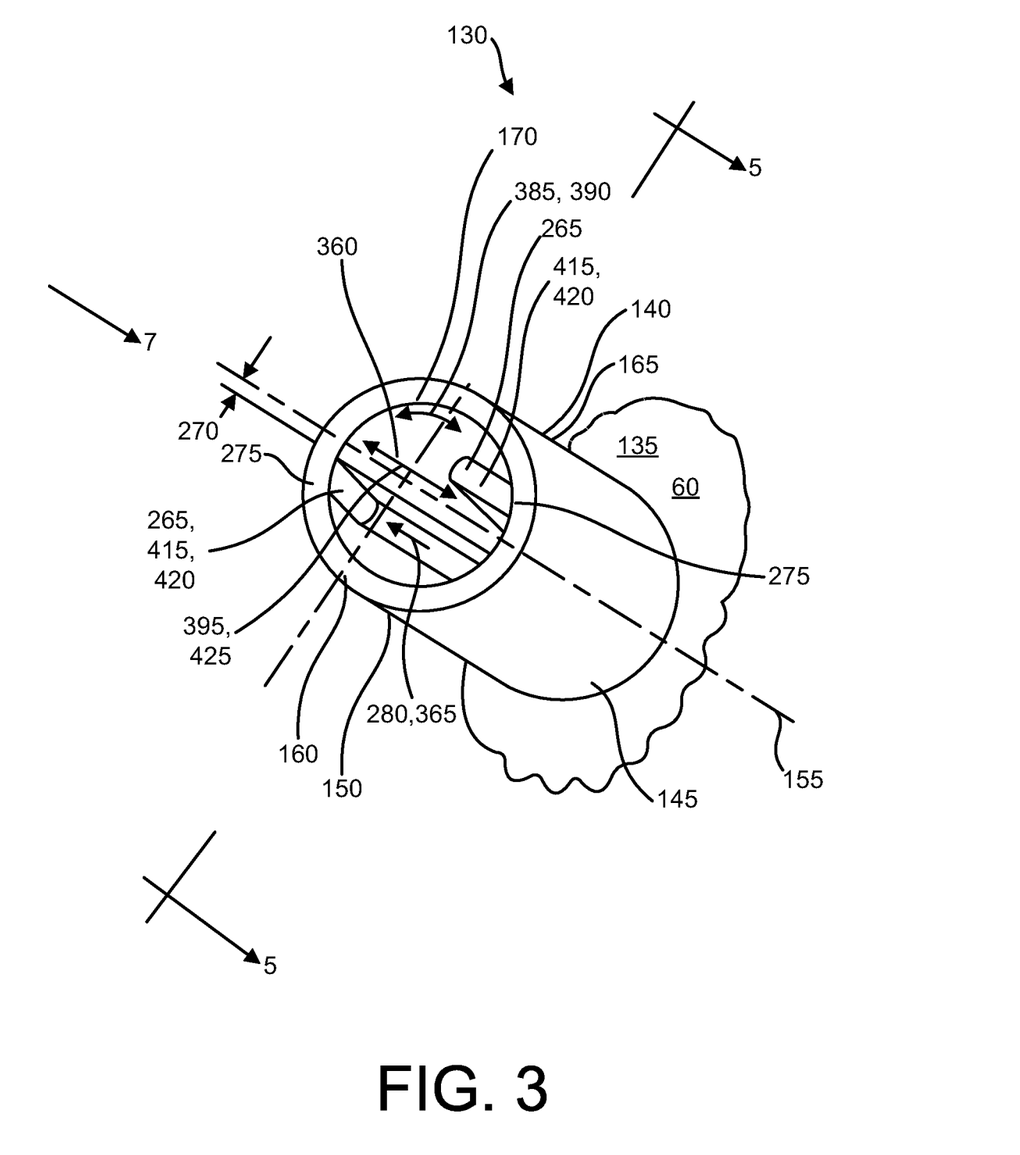
FIG. 3 shows an upper perspective view showing the flexible female element that includes the female element base, the longwise axis, the female inner and outer surfaces, and the female ridge protrusion.
Figure 4:
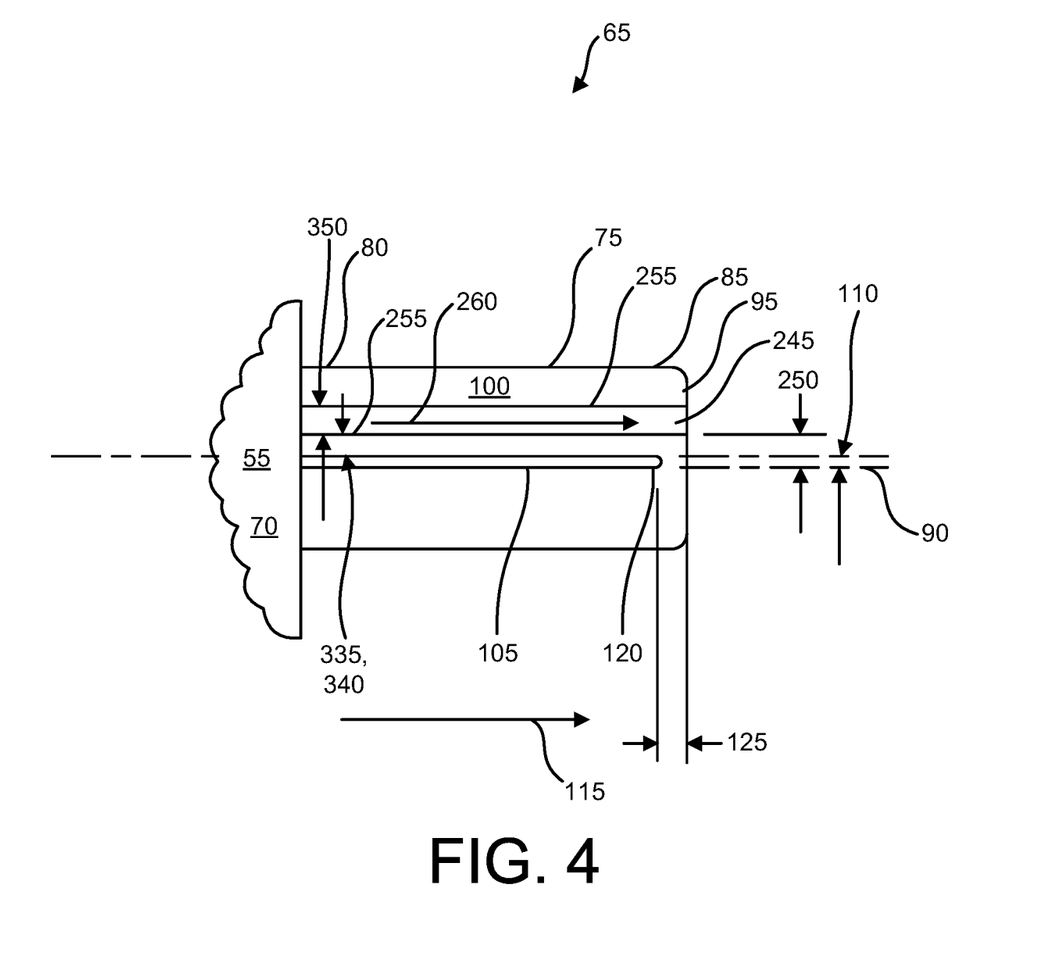
FIG. 4 shows a side elevation view of the flexible male element including the male element base, the longitudinal axis, the male outer surface, the rib, and the male channel.
Figure 5:
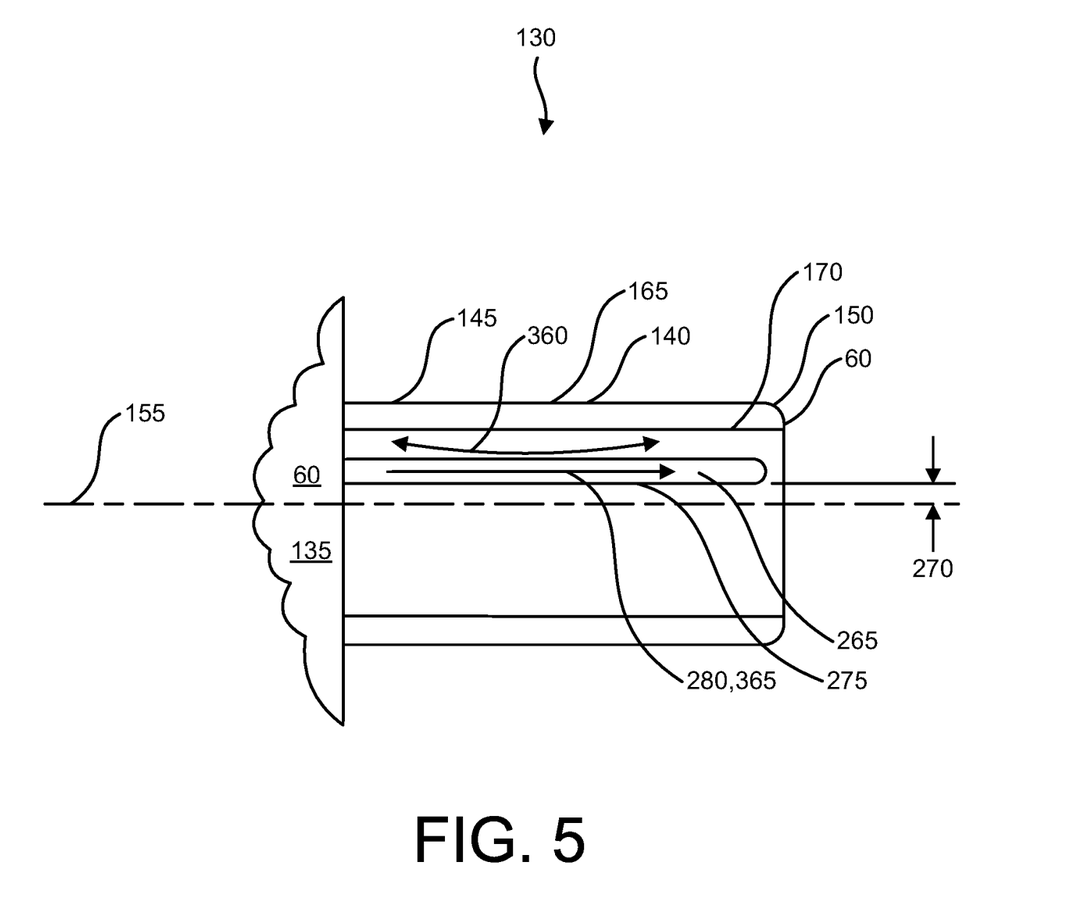
Figure 6:
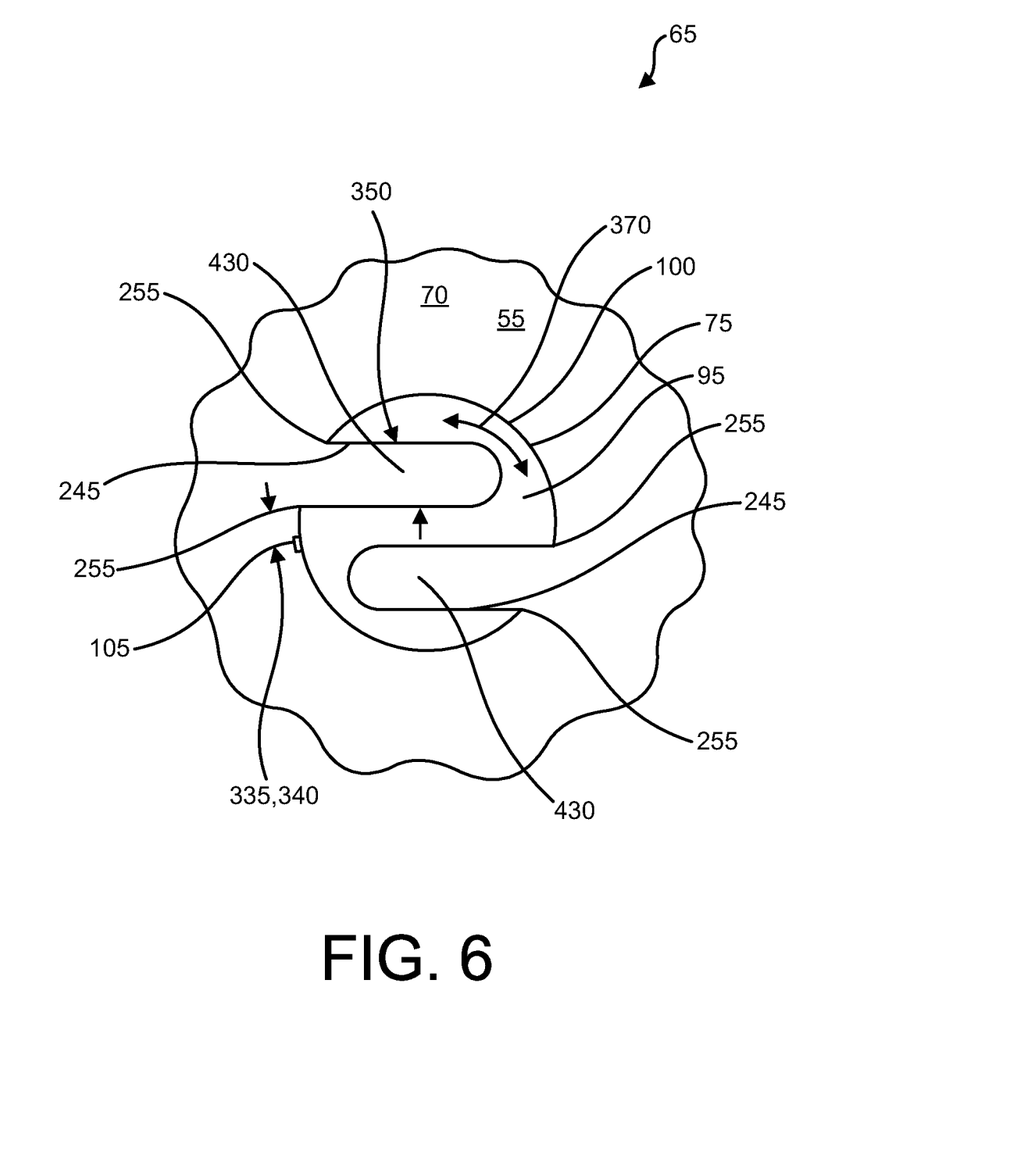

Next, FIG. 4 shows a side elevation view of the flexible male element 65 including the male element base 70, the longitudinal axis 90, the male outer surface 100, the rib 105, and the male channel 245. Further, FIG. 5 shows a cross section view 5-5 from FIG. 3, wherein FIG. 5 shows the flexible female element 130 that includes the female element base 135, the longwise axis 155, the female inner 170 and outer 165 surfaces, and the female ridge protrusion 265. Continuing, FIG. 6 shows an end elevation view 6-6 from FIG. 1, wherein FIG. 6 shows the flexible male element 65 including the male element base 70, the male outer surface 100, the rib 105, and the male channel 245.

Figure 7:
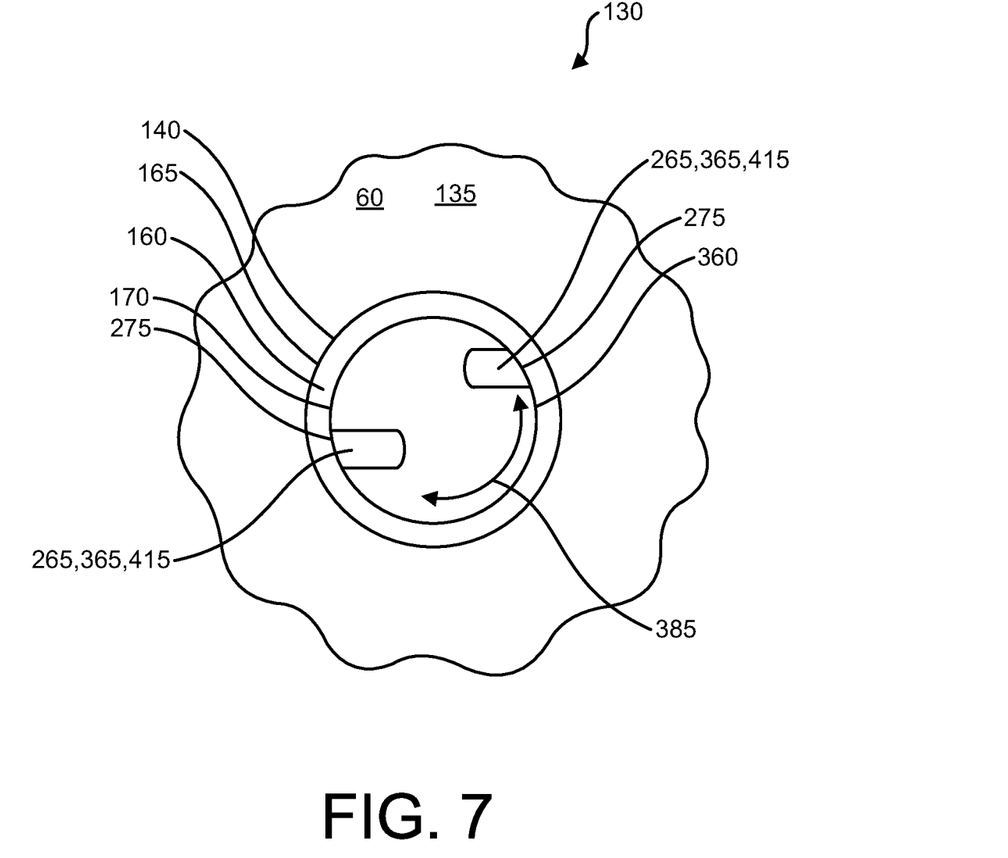
Figure 8:
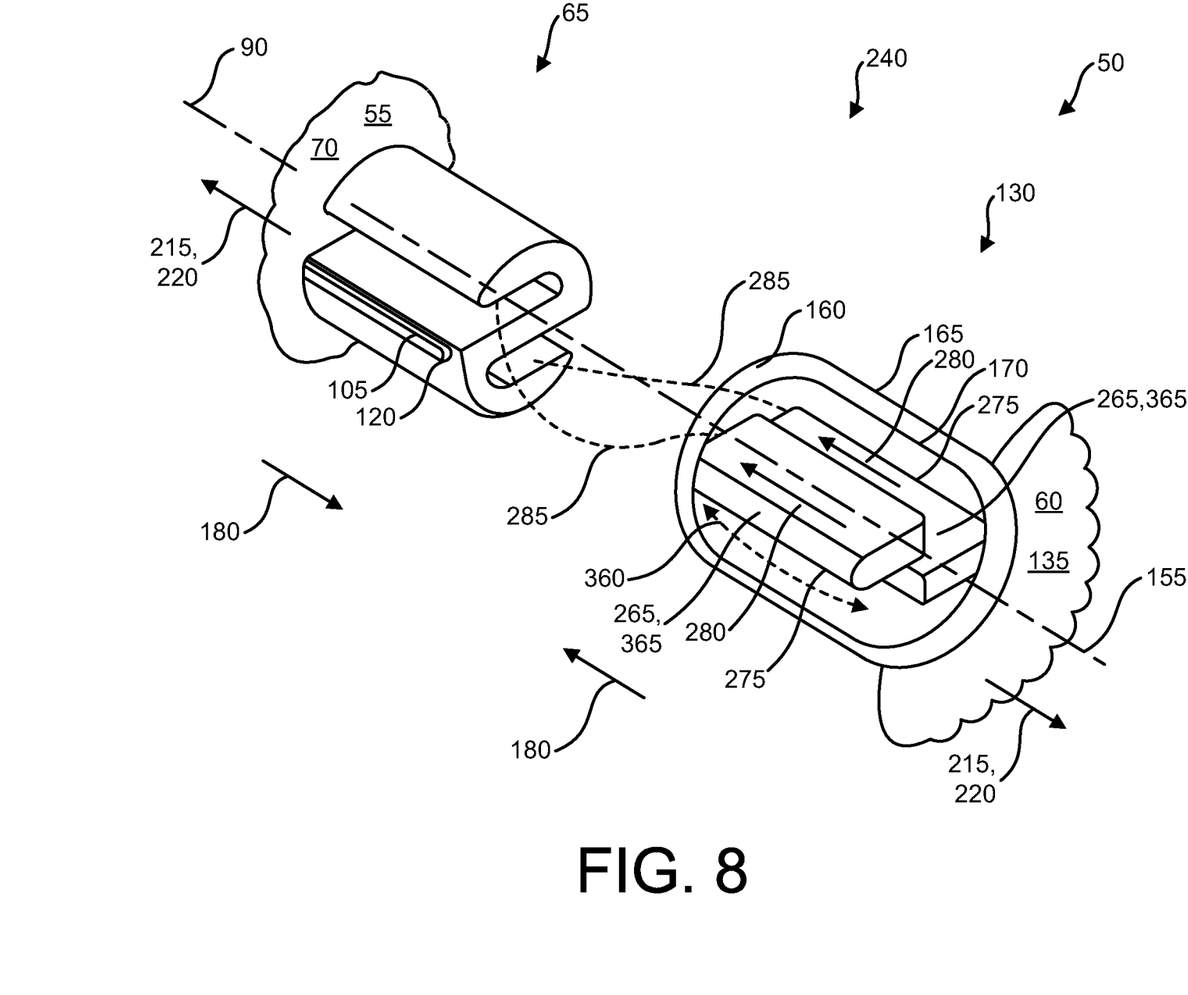
FIG. 8 shows an upper perspective view of a pre-assembly view of the flexible male and female elements, showing in particular the co-incident longitudinal and longwise axes and the path of connection as between the female ridge protrusion and the male channel.
Figure 9:
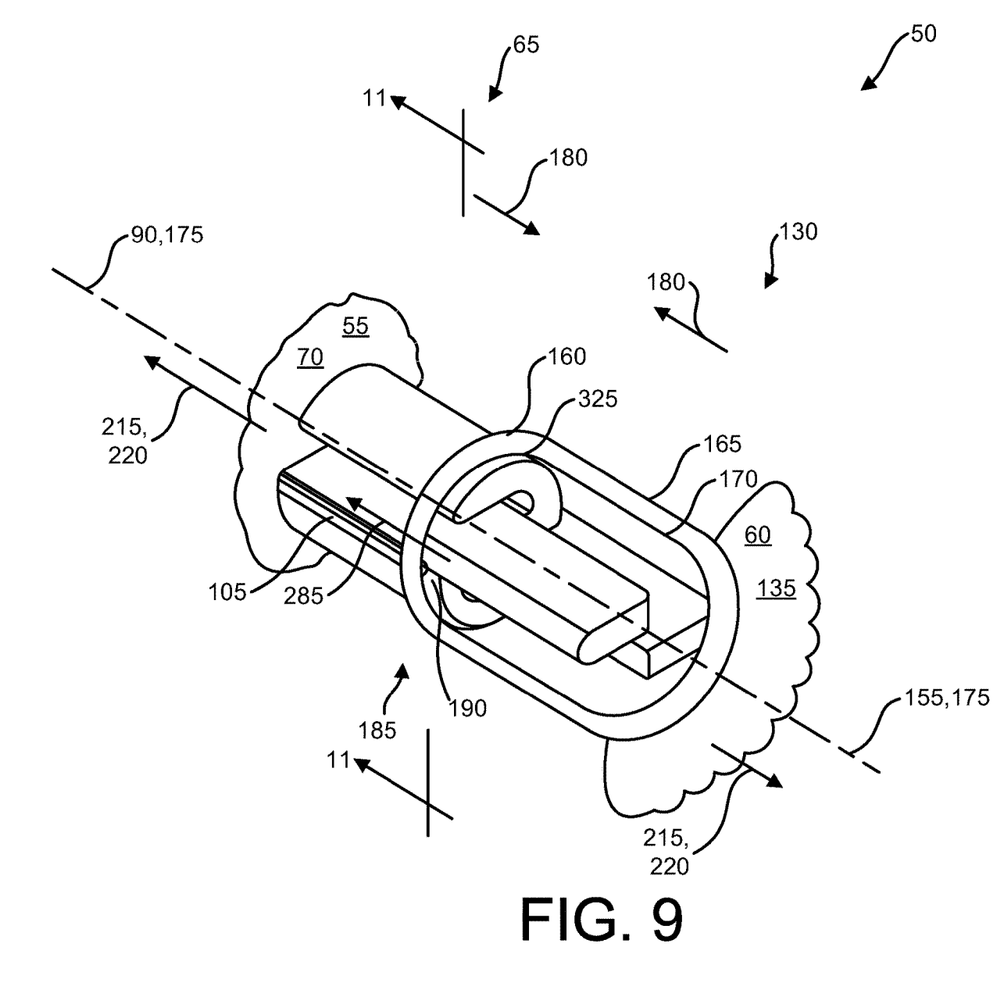
FIG. 9 shows an upper perspective view of a partial-assembly view of the flexible male and female elements, showing in particular the co-incident longitudinal and longwise axes and the initial slip fit insertion as between the female ridge protrusion and the male channel, wherein a pilot is formed with the gap portion for the initial slip fit insertion.

Moving onward, FIG. 7 shows an end elevation view 7 from FIG. 3, wherein FIG. 7 shows the flexible female element 130 that includes the female element base 135, the female inner 170 and outer 165 surfaces, and the female ridge protrusion 265. Next, FIG. 8 shows an upper perspective view of a pre-assembly view of the flexible male 65 and female 130 elements, showing in particular the co-incident 175 longitudinal 90 and longwise 155 axes and the path of connection 285 as between the female ridge protrusion 265 and the male channel 245. Next, FIG. 9 shows an upper perspective view of a partial-assembly view of the flexible male 65 and female 130 elements, showing in particular the co-incident 175 longitudinal 90 and longwise 155 axes and the initial slip fit insertion 185 as between the female ridge protrusion 265 and the male channel 245, wherein a pilot 190 is formed with the gap portion 125 for the initial slip fit insertion 185.

Figure 10:
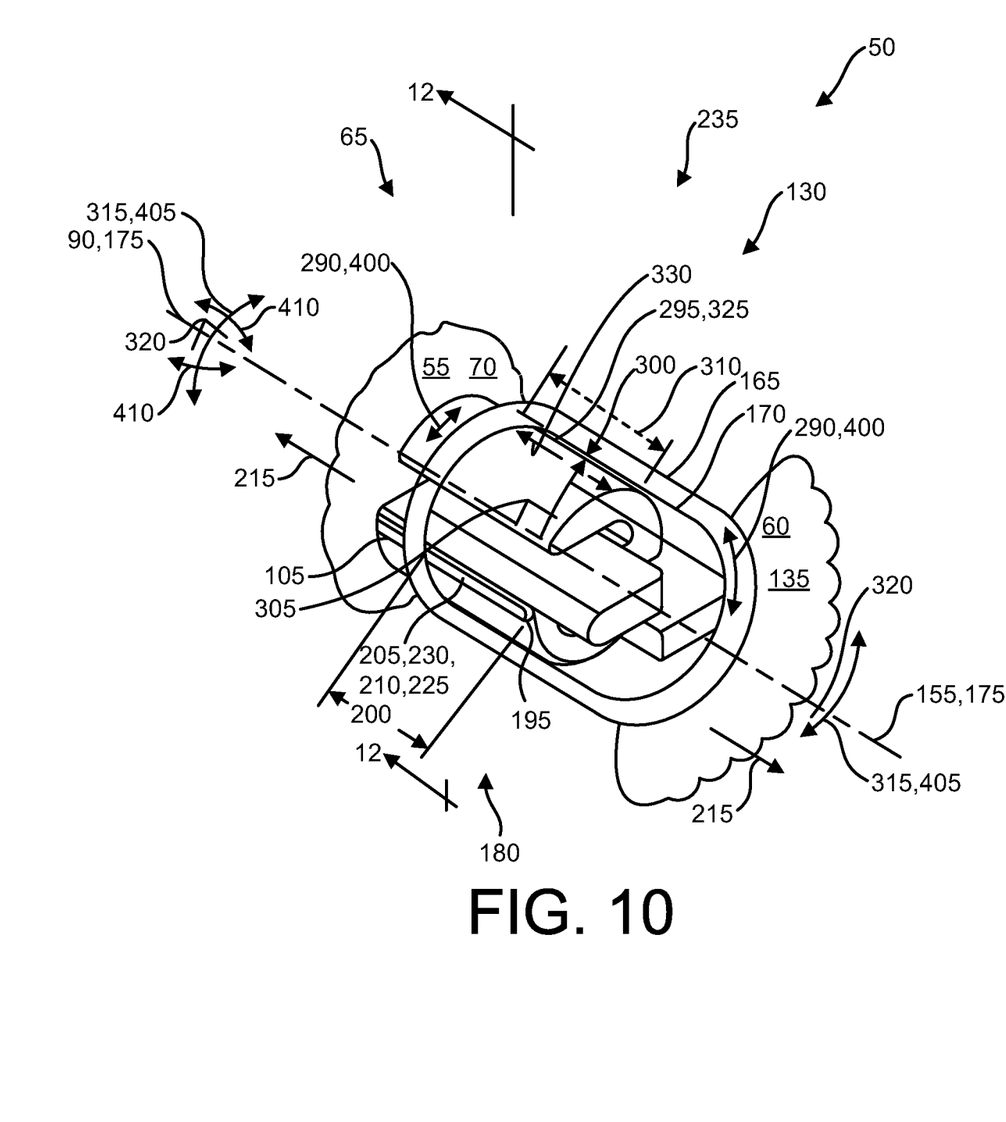
FIG. 10 shows an upper perspective view of an assembled view of the flexible male and female elements, showing in particular the co-incident longitudinal and longwise axes and the complete slip fit insertion as between the female ridge protrusion and the male channel, wherein the progressive frictional interference fit of the rib to the inner surface of the flexible female element is shown.
Figure 11:
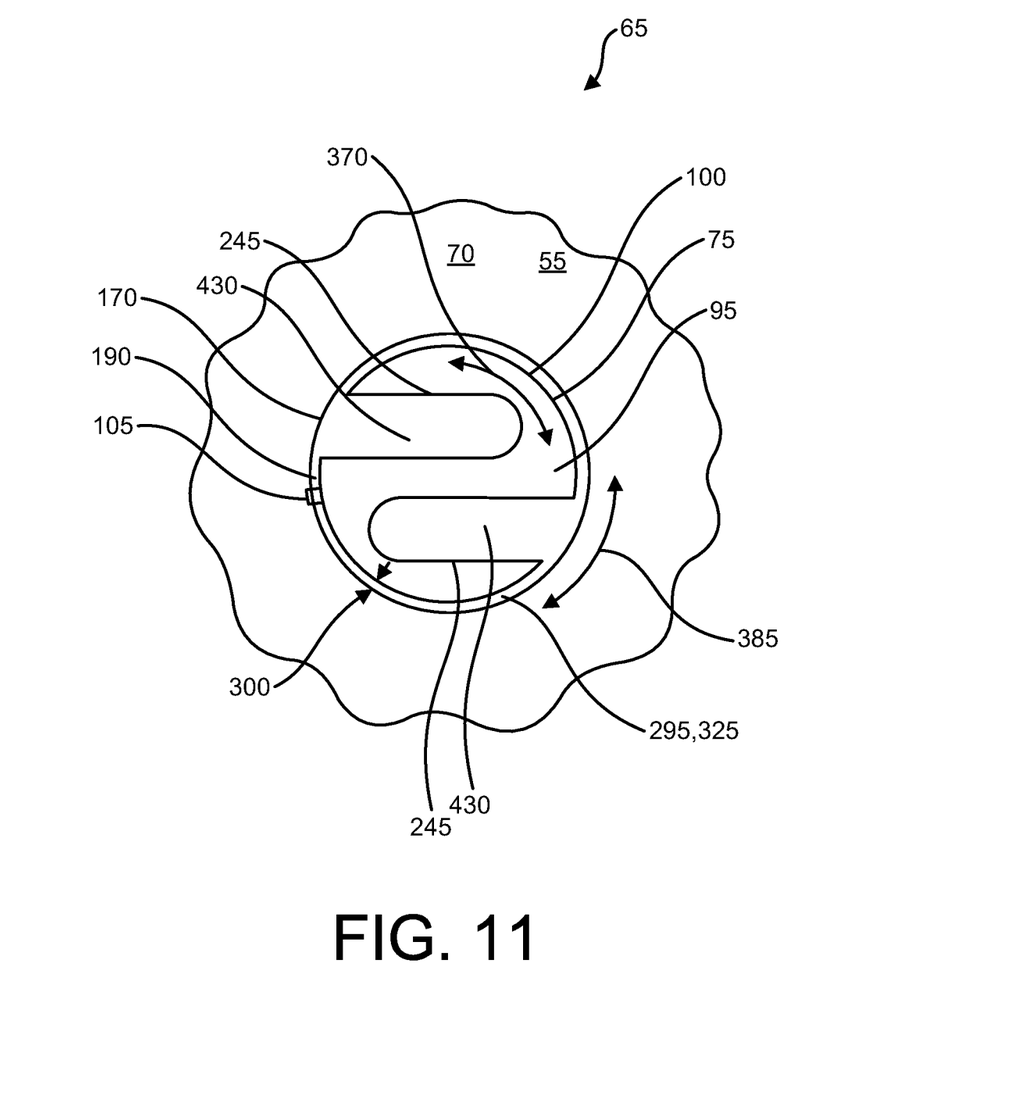

Next, FIG. 10 shows an upper perspective view of an assembled operational state view 235 of the flexible male 65 and female 130 elements, showing in particular the co-incident 175 longitudinal 90 and longwise 155 axes and the complete slip fit insertion 200, 210 as between the female ridge protrusion 265 and the male channel 245, wherein the progressive frictional interference fit 205 of the rib 105 to the inner surface 170 of the flexible female element 130 is shown. Further, FIG. 11 shows a cross section view 11-11 from FIG. 9, wherein FIG. 11 shows the flexible male element 65 outer surface 100 being initially inserted 185 into the flexible female element 130 inner surface 170 with the rib 105 not yet contacting the flexible female element 130 inner surface 170 thus the pilot 190 makes the initial slip fit insertion 185 as between the flexible male element 65 outer surface 100 being initially inserted 185 into the flexible female element 130 inner surface 170, so FIG. 11 is the cross section view 11-11 from FIG. 9.

Figure 12:
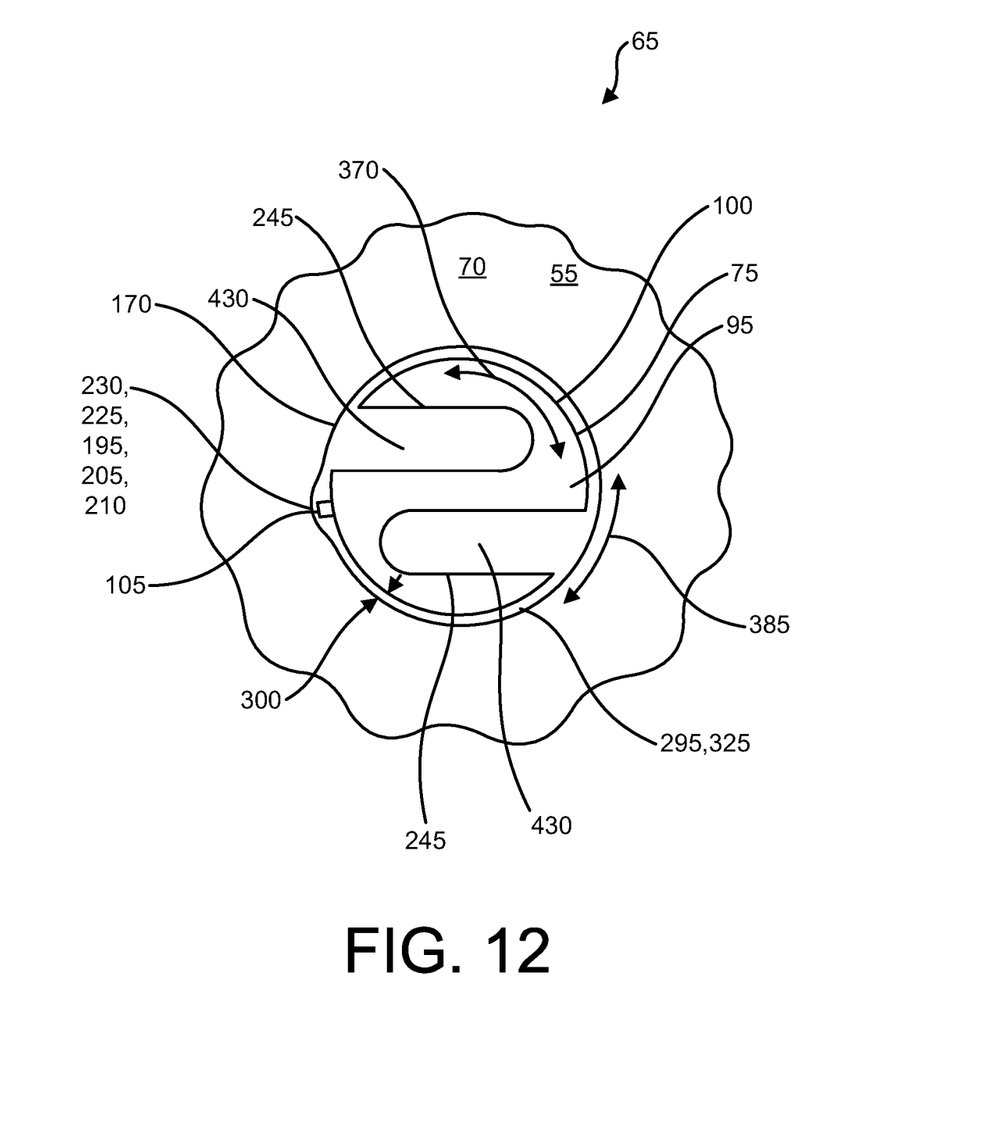
FIG. 12 shows the flexible male element outer surface being completely inserted into the flexible female element inner surface being in the assembled operational state, with the rib engaging in the progressive frictional interference fit of the rib to the inner surface of the flexible female element is shown, wherein the flexing on the rib as against the flexible female element inner surface is exaggerated for visual clarity.

Continuing, FIG. 12 shows a cross section view 12-12 from FIG. 10, wherein FIG. 12 shows the flexible male element 65 outer surface 100 being completely inserted 200, 205, 210 into the flexible female element 130 inner surface 170 being in the assembled operational state 235, with the rib 105 engaging in the progressive frictional interference fit 205 of the rib 105 to the inner surface 170 of the flexible female element 130 is shown, wherein the flexing on the rib 105 as against the flexible female element 130 inner surface 170 is exaggerated for visual clarity.

Broadly, in looking at FIGS. 1 to 12, the connection device 50 between the first article 55 which can be integral or attached to the male base 55 and a second article 60 which can be integral or attached to the female base 135, wherein the connection device 50 comprises a flexible male element 65 that includes the male element base 70 that is adjacent to the first article 55, the flexible male extension 75 that has a flexible male extension proximal end portion 80 and an opposing flexible male extension distal end portion 85 with the longitudinal axis 90 spanning therebetween, with the flexible male extension 75 distal end portion terminating in a flexible male extension distal end portion margin 95. Wherein the flexible male extension proximal end portion 80 is adjacent to the male element base 70, the flexible male extension 75 having the male outer surface 100 disposed between the flexible male extension proximal end portion 80 and the flexible male extension distal end portion 85. The rib 105 is disposed on the male outer surface 100, wherein the rib 105 is positioned substantially parallel 110 to the longitudinal axis 90, further the rib 105 extends 115 from the flexible male extension proximal end portion 80 to the flexible male extension distal end portion 85, wherein the rib 105 has a termination 120 short of the flexible male extension distal end portion 85 margin 95 leaving a gap portion 125 at the male outer surface 100 from the rib 105 termination 120 to the flexible male extension distal end portion 85 margin 95, see in particular FIGS. 1, 2, 4, 6, 11, and 12.

The connection device 50 also includes the flexible female element 130 that comprises the female element base 135 that is adjacent to the second article 60 and a flexible female extension 140 that has a flexible female extension proximal end portion 145 and an opposing flexible female extension distal end portion 150 with the longwise axis 155 spanning therebetween, with the flexible female extension distal end portion 150 terminating in a flexible female extension distal end portion margin 160, wherein the flexible female extension proximal end portion 145 is adjacent to the flexible female element base 135. The flexible female extension 140 having the female outer surface 165 disposed between the flexible female extension proximal end portion 145 and the flexible female extension distal end portion 150, the female inner surface 170 disposed between the flexible female extension proximal end portion 145 and the flexible female extension distal end portion 150, wherein positionally the longitudinal axis 90 and the longwise axis 155 are positioned coincident 175 to one another as between the flexible male 65 and female 130 elements. Wherein operationally to manually 180 assemble the connection device 50 into the assembled operational state 235, the male outer surface 100 is inserted into the female inner surface 170 utilizing the gap portion 125 as a pilot 190 to facilitate ease of an initial slip fit insertion 185 of the male outer surface 100 into the female inner surface 170 after which the rib 105 then contacts 195 the female inner surface 170 and turns the initial slip fit insertion 185 into a progressive frictional interference fit 205 of the male outer surface 100 into the female inner surface 170 that functionally results in a semi-securely hold 210 of the flexible male 65 and female 130 elements together via an increasing contact length 200 along the longitudinal axis 90 of the rib 105 with the female inner surface 170. To operationally reverse and disassemble 220 the connection device 50 into a disassembled operational state 240, the flexible male 65 and female 130 elements are manually pulled apart 215 along the longitudinal 90 and longwise 155 axes, against the progressive frictional interference fit 205 that continuously lessens the rib contact length 225 to progressively reduce the frictional interference fit 230 until the flexible male 65 and female 130 elements are separated from one another, see in particular FIGS. 3, 5, 7, and 8.

As an option for the connection device 50 on the flexible male extension 75, can further comprise a male channel 245 that is positioned substantially parallel 250 to the longitudinal axis 90, further the male channel 245 is disposed 255 in the male outer surface 100, wherein the male channel 245 extends 260 from the flexible male extension 75 proximal end portion 80 to the flexible male extension 75 distal end portion 85. The female flexible extension 140 further comprises a female ridge protrusion 265 that is positioned substantially parallel 270 to the longwise axis 155, further the female ridge protrusion 265 is disposed 275 on the female inner surface 170, wherein the female ridge protrusion 265 extends 280 from the flexible female extension 140 proximal end portion 145 to the flexible female extension 140 distal end portion 150. Wherein the female ridge protrusion 265 is slidably received 285 in the male channel 245 when the connection device 50 is in the assembled operational state 235, wherein operationally when the female ridge protrusion 265 is slidably received 285 in the male channel 245 the flexible male extension 75 is rotationally engaged 290 to the flexible female extension 140 about the longitudinal 90 and longwise 155 axes, see FIGS. 8, 9, and 10 in particular.

As a further option for the connection device 50, wherein the male outer surface 100 and the female inner surface 170 have a male and female slip fit positional relationship 295 along both the longitudinal 90 and longwise 155 axes to one another that acts as a guide 325 to provide rigidity 330 to the connection device 50 in the assembled operational state 235 in a bending axis 315 that is positioned perpendicular 320 to both the longitudinal 90 and longwise 155 axes, as accomplished via a radial distance 300 of the male 100 and female 170 slip fit positional relationship 295 that is perpendicular 305 to both the longitudinal 90 and longwise 155 axes. Wherein the radial distance 300 is less than an axial engagement distance 310 as between the flexible male extension distal end portion 85 and the flexible female extension distal end portion 150 when the connection device 50 is in the assembled operational state 235, again see FIGS. 8, 9, and 10 in particular.

A further option for the connection device 50, wherein the rib 105 is positioned adjacent 335 to the male channel 245 such that a rib distance 340 is formed as between the rib 105 and the male channel 245, wherein the rib 105 distance 340 is positioned perpendicular 345 to the longitudinal axis 90, further the rib 105 distance 340 is less than a male channel 245 width distance 350 that is positioned perpendicular 355 to the longitudinal axis 90. Wherein operationally the rib 105 being positioned adjacent 335 to the male channel 245 takes advantage of a higher female inner surface 170 rigidity 360 adjacent to the female ridge protrusion 265 acting as a stiffening beam 365 for the female inner surface 170 as the female ridge protrusion 265 is slidably received 285 into the male channel 245 that is adjacent 335 to the rib 105, thus further facilitating the progressive frictional interference fit 205 of the rib 105 to the female inner surface 170, see FIGS. 1, 2, 4, 6, and FIGS. 8 to 12.

Alternatively, for the connection device 50, wherein the male outer surface 100 is in a substantially circular shape 370 in a first plane 375 that is positioned perpendicular 380 to the longitudinal axis 90 and the female inner surface 170 is in a substantially circular shape 385 in a second plane 390 that is positioned perpendicular 395 to the longwise axis 155, to operationally make a more symmetric stress distribution 400 in the flexible male 75 and female 140 extensions in the connection device 50 assembled operational state 235, being from a bending force 405 in the bending axis 315 wherein the bending force 405 can be applied in any position 410 about the longitudinal 90 and longwise 155 axes, see FIG. 10 in particular.

Another alternative, for the connection device 50, wherein the female ridge protrusion 265 has a substantially trapezoidal cross-sectional shape 415 through a third plane 420 that is positioned perpendicular 425 to the longwise axis 155 and the male channel 245 has a substantially trapezoidal cross-sectional shape 430 through a fourth plane 435 that is positioned perpendicular 440 to the longitudinal axis 90, wherein operationally the female ridge protrusion 265 trapezoidal shape 415 and the male channel 245 trapezoidal shape 430 accommodate the female inner surface 170 substantially circular shape 385 and the male outer surface 100 substantially circular shape 370 respectively, see FIGS. 1 and 3.

CONCLUSION

Accordingly, the present invention of a connection device has been described with some degree of particularity directed to the embodiments of the present invention. It should be appreciated, though; that the present invention is defined by the following claims construed in light of the prior art so modifications of the changes may be made to the exemplary embodiments of the present invention without departing from the inventive concepts contained therein.

The invention claimed is:

1. A connection device between a first article and a second article, comprising:
    (a) a flexible male element that includes;
        (a)(i) a male element base that is adjacent to the first article;
        (a)(ii) a flexible male extension that has a flexible male extension proximal end portion and an opposing flexible male extension distal end portion with a longitudinal axis spanning therebetween, with said flexible male extension distal end portion terminating in a flexible male extension distal end portion margin, wherein said flexible male extension proximal end portion is adjacent to said male element base, said flexible male extension having a male outer surface disposed between said flexible male extension proximal end portion and said flexible male extension distal end portion, a rib disposed on said male outer surface, wherein said rib is positioned parallel to said longitudinal axis, further said rib extends from said flexible male extension proximal end portion to said flexible male extension distal end portion, wherein said rib has a termination short of said flexible male extension distal end portion margin leaving a gap portion at said male outer surface from said rib termination to said flexible male extension distal end portion margin, wherein said flexible male extension further comprises a male channel that is positioned parallel to said longitudinal axis, further said male channel is disposed in said male outer surface, wherein said male channel extends from said flexible male extension proximal end portion to said flexible male extension distal end portion;
    (b) a flexible female element that includes;
        (b)(i) a female element base that is adjacent to the second article; and (b)(ii) a flexible female extension that has a flexible female extension proximal end portion and an opposing flexible female extension distal end portion with a longwise axis spanning therebetween, with said flexible female extension distal end portion terminating in a flexible female extension distal end portion margin, wherein said flexible female extension proximal end portion is adjacent to said flexible female element base, said flexible female extension having a female outer surface disposed between said flexible female extension proximal end portion and said flexible female extension distal end portion, a female inner surface disposed between said flexible female extension proximal end portion and said flexible female extension distal end portion, said female flexible extension further comprises a female ridge protrusion that is positioned parallel to said longwise axis, further said female ridge protrusion is disposed on said female inner surface, wherein said female ridge protrusion extends from said flexible female extension proximal end portion to said flexible female extension distal end portion, wherein positionally said longitudinal axis and said longwise axis are positioned coincident to one another as between said flexible male and female elements, wherein operationally to manually assemble said connection device into an assembled operational state, said male outer surface is inserted into said female inner surface utilizing said gap portion as a pilot to facilitate ease of an initial slip fit insertion of said male outer surface into said female inner surface after which said rib then contacts said female inner surface and turns said initial slip fit insertion into a progressive frictional interference fit of said male outer surface into said female inner surface that functionally results in a semi-securely hold of said flexible male and female elements together via an increasing contact length along said longitudinal axis of said rib with said female inner surface, to operationally reverse and disassemble said connection device into a disassembled operational state, said flexible male and female elements are manually pulled apart along said longitudinal and longwise axes, against said progressive frictional interference fit that continuously lessens said rib contact length to progressively reduce said frictional interference fit until said flexible male and female elements are separated from one another, wherein said female ridge protrusion is slidably received in said male channel when said connection device is in said assembled operational state, wherein operationally when said female ridge protrusion is slidably received in said male channel, said flexible male extension is rotationally engaged to said flexible female extension about said longitudinal and longwise axes, wherein said male outer surface and said female inner surface have a male and female slip fit positional relationship along both said longitudinal and longwise axes to one another that acts as a guide to provide rigidity to said connection device in said assembled operational state in a bending axis that is positioned perpendicular to both said longitudinal and longwise axes, as accomplished via a radial distance of said male and female slip fit positional relationship that is perpendicular to both said longitudinal and longwise axes, wherein said radial distance is less than an axial engagement distance as between said flexible male extension distal end portion and said flexible female extension distal end portion when said connection device is in said assembled operational state, wherein said rib is positioned adjacent to said male channel such that a rib distance is formed as between said rib and said male channel, wherein said rib distance is positioned perpendicular to said longitudinal axis, further said rib distance is less than a male channel width distance that is positioned perpendicular to said longitudinal axis, wherein operationally said rib being positioned adjacent to said male channel takes advantage of a higher female inner surface rigidity adjacent to said female ridge protrusion acting as a stiffening beam for said female inner surface as said female ridge protrusion is slidably received into said male channel that is adjacent to said rib, thus further facilitating said progressive frictional interference fit of said rib to said female inner surface.

2. A connection device according to claim 1 wherein said male outer surface is in a circular shape in a first plane that is positioned perpendicular to said longitudinal axis and said female inner surface is in a circular shape in a second plane that is positioned perpendicular to said longwise axis, to operationally make a more symmetric stress distribution in said flexible male and female extensions in said connection device assembled operational state, being from a bending force in said bending axis wherein said bending force can be applied in any position about said longitudinal and longwise axes.

3. A connection device according to claim 2 wherein said female ridge protrusion has a trapezoidal cross-sectional shape through a third plane that is positioned perpendicular to said longwise axis and said male channel has a trapezoidal cross-sectional shape through a fourth plane that is positioned perpendicular to said longitudinal axis, wherein operationally said female ridge protrusion trapezoidal shape and said male channel trapezoidal shape accommodate said female inner surface circular shape and said male outer surface circular shape respectively.

* * * * *